July 17, 1962   M. B. BROOME ET AL   3,044,175
RESPONDER AND TELEMETERING TRANSMITTER FOR BOREHOLE CALIPER
Filed Aug. 14, 1959   2 Sheets-Sheet 1

INVENTORS
Marshall B. Broome
BY Robert L. Tucker

Robert K. Schumacher
ATTORNEY

July 17, 1962  M. B. BROOME ET AL  3,044,175
RESPONDER AND TELEMETERING TRANSMITTER FOR BOREHOLE CALIPER
Filed Aug. 14, 1959  2 Sheets-Sheet 2

INVENTORS
Marshall B. Broome
BY Robert L. Tucker
Robert K. Schumacher
ATTORNEY

United States Patent Office 3,044,175
Patented July 17, 1962

3,044,175
RESPONDER AND TELEMETERING TRANSMITTER FOR BOREHOLE CALIPER
Marshall B. Broome, Tulsa, Okla., and Robert L. Tucker, Dallas, Tex., assignors to Well Surveys, Incorporated, a corporation of Delaware
Filed Aug. 14, 1959, Ser. No. 833,758
4 Claims. (Cl. 33—178)

The present invention relates to well logging apparatus and more particularly to a telemetering circuit for transmitting from a well tool to a recording mechanism at a surface station, electrical pulses indicative of a physical measurement performed by apparatus forming a part of the well tool. Although the circuitry of the present invention is applicable to the conversion of a mechanical movement, irrespective of the underlying cause of the movement, to electrical pulses having a repetition rate indicative of a quantity, it is described as applied to a well logging apparatus as an illustrative embodiment of a system with which the circuitry may be employed.

In the field of well logging, a number of tests have been devised for measuring various physical properties of the strata intercepted by the well bore, the results of these tests indicating to the trained observer the likelihood of the presence of crude oil or natural gas in the vicinity of the well bore. One such test which is employed extensively is the measurement of the well bore diameter as a function of depth of the well. During a boring operation the flow of mud in and around the boring tool and through the well bore above the tool, abrades the exposed surface of the various strata and enlarges the bore to an extent directly related to the brittleness of the material of the various strata. A calipering tool is conventionally employed in conjunction with recording instruments to obtain a measurement of the diameter of the well as a function of its depth in order to produce an indication of the brittleness of the individual strata and also to produce indications delineating the boundaries of the strata. Conventionally, a well tool is provided with calipering arms and the tool is lowered to the bottom of the well with the arms retracted. Once the tool has attained the bottom of the well, the calipering arm or arms are permitted to expand into contact with the sides of the well and the tool is retracted. The position of the calipering arm or arms relative to the well tool casing is measured and converted to an electrical signal indicative of the position of the calipering arm with respect to the well tool casing and therefore of the diameter of the well. This electrical signal is transmitted to a receiving station located at the surface and is recorded against the depth of the tool to produce a log of well diameter versus well depth.

Well bores are often quite deep and therefore it is preferable to generate high energy signals at the well tool for the signals received at the surface station to be of sufficient amplitude to be readily detected and to be readily distinguished from noise signals. Further, in withdrawing the tool from a very deep well towards the surface, the instrument is subject to supply voltage changes and relatively large ambient temperature changes which in a voltage and temperature sensitive instrument may produce variations in the electrical signal of a substantial magnitude with respect to the indications of changes in well diameter.

It is therefore an object of the present invention to provide circuits for converting mechanical movement to an electrical signal which are relatively insensitive to temperature changes and which produce electrical indications of sufficient amplitude and energy content to be readily detectable and to be readily distinguishable from noise signals.

It is another object of the present invention to provide electrical circuits for converting a mechanical movement to a variable pulse frequency which circuits are compact and rugged and may be fabricated from a few inexpensive and readily available components.

It is yet another object of the present invention to provide highly stable and rugged circuits for converting mechanical movement to a variable frequency pulse train, which circuits are relatively insensitive to temperature changes and supply voltage changes.

In accordance with the present invention there is provided a circuit employing a double cathode coupled phantastron oscillator circuit in which the frequency of oscillation is controlled in accordance with the diameter of a well. The phantastron oscillator circuit employs two pentode amplifier tubes having their anodes returned through distinct diodes to a common variable voltage source. The anodes of the pentodes are connected to the anodes of the diodes and the cathodes of the diodes are connected together and to a variable impedance connected between a center conductor of a well cable and a point of reference potential such as ground. High voltage is applied to the well cable at a ground station and variations of the aforesaid impedance changes the clamping voltage at the anodes of the two pentodes and produces a variation of the frequency of the phantastron oscillator.

In accordance with a first specific embodiment of the present invention, a resistive element of a potentiometer is connected in series between the cable and ground and the slider of the potentiometer is electrically connected to the cathodes of the aforesaid diodes and is mechanically coupled to the caliper arm or arms. Since the potentiometer resistance is in series with the high voltage cable, the voltage on the slider is a linear function of the movement of the slider. The period of oscillations of the oscillator is a linear function of the voltage on the cathodes of the diodes and consequently the frequency of oscillation is an inverse function of the movement of the slider. However, if the circuit is properly designed and the movements of the slider are relatively small an almost linear frequency versus slider position function may be obtained.

As indicated, the frequency of oscillation of the phantastron oscillator may be varied by varying the potential on the cathodes of the diodes connected to the anodes of the pentodes in order to vary the quiescent operating voltage of the pentodes. Variations in temperature, however, produce variations in the voltage across the diode at which conduction of the diode commences and therefore produces small variations in the quiescent voltage at which the anodes of the pentodes are clamped. This affects the period of oscillation of the phantastron and therefore the frequency. The variation of the breakdown voltage of the diodes is quite small and at low frequencies, 60 c.p.s for instance, the total variation of the conduction interval of the diode relative to the period of oscillation is sufficiently small to be readily disregarded. However, if the circuit is employed at frequencies of the order of magnitude of 1000 c.p.s. or higher, the variation of the interval of conduction of the diode with temperature becomes sufficiently large relative to the period of oscillation to produce a measurable effect on frequency. In order to overcome the variations in anode clamping potential with temperature, a thermistor may be connected in circuit with the resistor of the potentiometer in order to produce a variation in the voltage available at the potentiometer slider which compensates for the change in conduction voltage of the diodes. More particularly, if the voltage at which a diode conducts is reduced with a rise in temperature, then it is necessary to raise the voltage at the cathode of the diode in order to maintain the point at which the diode conducts at a predetermined anode voltage.

An output voltage may be taken from the double coupled phantastron oscillator at the screen grid of one of the pentodes and is applied to a differentiating and clipping circuit so as to produce spiked positive pulses which are applied to a pentode connected as a power amplifier. The output voltage from the anode of the pentode amplifier is applied through a coupling and blocking capacitor to the well bore cable so that the pulses are transmitted over the cable to the ground station. This same cable, as previously indicated, carries a high voltage for operation of the circuits and decoupling circuits are employed to isolate the anode circuits of the various tubes from the alternating current signals applied to the well cable. Spiked pulses are employed so that pulses having a large energy content but of short duration are transmitted, thereby permitting the pentode to operate at above its average energy dissipating capacity for short periods without damaging the tube.

The basic circuit of the present invention, that is, the circuit employing a double-coupled phantastron oscillator, the frequency of oscillation of which is varied by varying the voltage applied to the anodes of the tubes through diodes, is not limited to utilization with a circuit which produces a linear variation of voltage with movement of the potentiometer slider. The basic circuit may be combined with a function generator which produces an output voltage that is an inverse function of the movement of the caliper arm. Since the frequency of the phantastron oscillator is an inverse function of the applied voltage and since in the function generator described above the output voltage applied to the oscillator is an inverse function of position of the caliper, the output frequency of the oscillator is a linear function of the position of the caliper. This latter circuit is particularly useful when relatively large variations of the diameter of a well are encountered and in accordance with the invention, a temperature compensating circuit may be included in the oscillator apparatus, so that the circuit may be employed to generate high frequencies and to measure large variations in well diameter.

The apparatus of the invention is completely compatible with existing calipering devices in which the movement of a calipering arm is utilized to oscillate or reciprocate a potentiometer slider with respect to its associated resistor. A calipering tool with which the apparatus may be employed is described in co-pending U.S. application Serial No. 838,205, filed by William A. Camp on September 4, 1959 and entitled Retractor Device for Oil Well Logging Tool. In this application there is described an apparatus for converting the movement of a caliper with respect to a well tool casing to rotary motion of a shaft and for connecting the shaft to the rotatable wiper of a potentiometer. The potentiometer of the co-pending application may be employed as the potentiometer of the circuit described above.

It is therefore an object of the present invention to provide a double cathode coupled phantastron oscillator circuit as a variable frequency oscillator in a well logging system.

It is another object of the present invention to provide a temperature compensation circuit for diodes employed in a circuit for varying the frequency of oscillation of a cathode coupled phantastron oscillator circuit.

It is still another object of the present invention to provide a circuit for converting movement of the caliper arms of a well logging tool to a variable frequency wave train which circuit employs a double cathode coupled phantastron oscillator circuit, the output of which is differentiated and amplified and applied to a well logging cable from which the active circuit elements receive their operating potentials.

Still another object of the invention is to provide a well caliper measuring system in which mechanical displacement controls the rate of production of pulses, which pulses, which pulses are measurable with counting rate meters already on hand in existing surface apparatus for well logging.

The above and still further objects, features and advantages of the present invention will become apparent upon consideration of the following detailed description of specific embodiments thereof, especially when taken in conjunction with the accompanying drawings, wherein.

Figure 1:
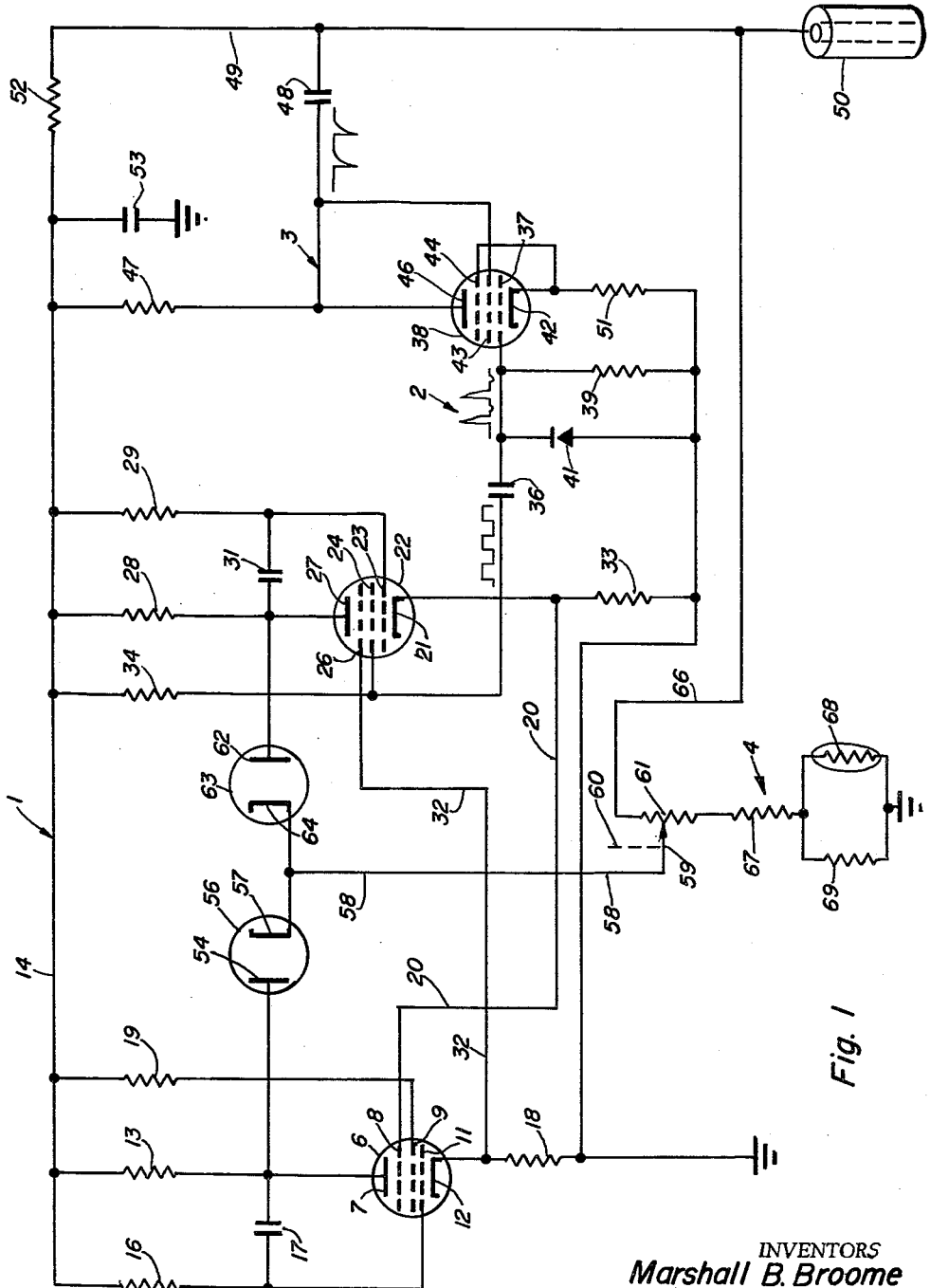
FIGURE 1 is a schematic wiring diagram of a first embodiment of the apparatus of the present invention.

Referring specifically to FIGURE 1 of the accompanying drawing there is illustrated the wiring diagram of the responder and telemetering transmitter of the present invention which comprises four basic components. The four basic components are a double cathode coupled phantastron, designated by the reference numeral 1, a shaper circuit, designated by the reference numeral 2, a cable driver circuit, designated by the reference numeral 3, and a control and temperature compensation circuit, designated by the reference numeral 4. The double cathode coupled phantastron comprises a first pentode 6 having an anode 7, a suppressor grid 8, a screen grid 9, a control grid 11, and a cathode 12. The anode 7 is connected through a load resistor 13 to a high voltage bus 14 while the control grid 11 is connected through a resistor 16 to the bus 14. The grid 11 and anode 7 are interconnected by an integrating capacitor 17 and the cathode 12 is connected to a reference potential, hereinafter referred to as ground, through a resistor 18. The screen grid 9 is connected through a resistor 19 to the high voltage bus 14 and the suppressor grid 8 is connected via a lead 20 to a cathode 21 of a second pentode 22. The pentode 22 further comprises a control grid 23, a screen grid 24, a suppressor grid 26, and an anode 27. The anode 27 and the control grid 23 are connected through resistors 28 and 29 respectively to the high voltage bus 14. The control grid 23 and the anode 27 of the pentode 22 are connected together through an integrating capacitor 31. The suppressor grid 26 is connected via a lead 32 to the cathode 12 of the pentode 6 and the cathode 21 is connected through a cathode resistor 33 to ground.

The screen grid 24 of the pentode 22 is further connected via a resistor 34 to the high voltage bus 14 and through a differentiating capacitor 36 to a control grid 37 of a further pentode 38. The control grid 37 is connected to ground via a differentiating resistor 39 connected in parallel with a diode 41 having its cathode connected to the grid 37, the capacitor 36, resistor 39, and clamping diode 41 constituting the shaping circuit 2. The pentode 38 further comprises a cathode 42, a screen grid 43, a suppressor grid 44, and an anode 46. The anode is connected via a load resistor 47 to the high voltage bus 14 and through a coupling capacitor 48 to a lead 49. The screen grid 43 of the pentode 38 is connected to the anode 46 and the suppressor grid 44 is connected to the cathode 42. The cathode 42 is connected to ground through a resistor 51, and thus the pentode 38 is connected to provide a conventional pentode power amplifier employed as the cable driving circuit 3. The lead 49 is adapted to be connected to the center conductor of a well logging cable 50 which has a high voltage applied thereto at the surface station. The lead 49 is further connected via a resistor 52 to the high voltage bus 14, and A.C. decoupling between the lead 49 and the bus 14 is effected by the decoupling capacitor 53 connected between the bus 14 and ground.

Returning again to the phatastron circuit 1, the anode 7 of the pentode 6 is connected to an anode 54 of a diode 56 having a cathode 57 connected via a lead 58 to a variable tap 59 on the resistor 61. The anode 27 of the pentode 22 is connected to an anode 62 of a diode 63 having a cathode 64 connected to the cathode 57 of the diode 56. The resistor 61 has its upper end, as viewed in FIGURE 1 of the accompanying drawings, connected via a lead 66 to the cable 49 and has its lower end connected through a resistor 67 and to a parallel combination of a thermistor 68 and a resistor 69 having their ends remote from the resistor 67 connected to ground.

Describing now the operation of the double cathode coupled phantastron 1, it is assumed initially that the pentode 6 is conducting and that the pentode 22 is non-conducting. When it is stated that the tube 22 is non-conducting this is intended to mean that no current is flowing to the anode 27 even though a relatively large current flows to the screen grid 24 and therefore the cathode voltage is relatively high (see graph B of FIGURE 2). The screen voltage, which is illustrated in graph E, is relatively low due to the heavy flow of current through its associated resistor 34. Since no current flows to the anode, the anode voltage illustrated by graph D is high and the control grid voltage is also high, as illustrated in graph C, since the tube is operated as a cathode follower and the grid follows the cathode. Upon reduction of conduction of current flow to the anode 7 of tube 6, for reasons to become apparent subsequently, its voltage begins to rise, raising the control grid voltage and increasing current flow in the tube. Increased current flow raises the cathode 12 voltage and as indicated at $t_2$ in FIGURE 2 raises the voltage on the suppressor grid 26 of the pentode 22. A rise in voltage of the suppressor grid 26 switches a portion of the current previously flowing to the screen grid 24 to the anode 27 and the voltage on the anode 27 falls. The reduction in voltage on the anode 27 is reflected in a similar reduction of voltage on the control grid 23 which reduces total conduction through the tube 22 and therefore effects a reduction in the voltage on the cathode 21. The reduction of voltage on the cathode 21 reduces the voltage on the suppressor grid 8 of the tube 6 and therefore further reduces current flow to the anode 7. The action of the tubes is regenerative and the sudden changes in the voltages of the various components as indicated at time $t_1$ are effected. Referring now to the description of the operation of the circuits after time $t_1$, the charge on the capacitor 31 gradually begins to leak off thereby causing a gradual rise in the voltage on the grid 23 which is reflected in an increased current flow through the tube. The increased current flow produces a gradual rise in the voltage of the cathode 21 and at the same time produces a relatively large rate of decrease in the voltage on the anode 27, the large rate of decrease in anode voltage being due to the amplification factor of the tube. The voltage on the screen grid 24 remains substantially constant, this being determined by the control grid and suppressor grid voltages which, as seen in FIGURE 2, graphs C and A, respectively, vary only slightly.

Figure 2:
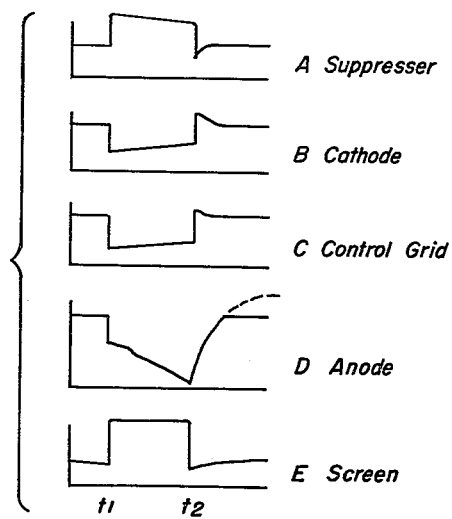
FIGURE 2 is an illustration of various graphs employed in describing the operation of the circuits of the present invention.

After a predetermined length of time, the voltage on the anode 27 has decreased sufficiently to reduce the anode-to-cathode voltage to a point where an initial reduction in current flow through the tube 22 is produced, this occurring at the time $t_2$ on the graphs of FIGURE 2. The reduction in current flow to the anode 27 tends to cause a sudden rise in the voltage of the anode which raises the voltage of the control grid 23 and therefore increases the current through the tube 22. The increase in current through the tube 22 increases the voltage of the cathode 21 which raises the voltage on the suppressor grid 8 of the tube 6. This begins to reduce the voltage at the anode 7 of the tube 6 and also at the control grid 11 and effects a reduction in the voltage on the cathode 12. The reduction in voltage of the cathode 12 produces a reduction in the voltage at the suppressor grid 26 of the tube 22 and further reduces the current to the anode 27.

Again, a regenerative action takes place and the voltage at the suppressor grid falls to the value at which it isolates the anode 27 from the cathode 21. The cathode voltage rises to a high value as does the control grid which follows the cathode as a result of the cathode follower action. All of the current is again switched back to the screen grid whose voltage therefore falls to its original value. The voltage on the anode 27, however, does not rise instantaneously as a result of the action of the capacitor 31 and only can rise at a rate determined by the time constant of the circuit comprising the resistors 28 and 29 and the capacitor 31. Normally, the voltage on the anode 27 rises to the value of the voltage on the bus 14 but this action may be modified and is modified in the circuit of the present invention by the action of the diodes 56 and 63. As a result of the action of the diodes, the anodes 7 and 27 of the tubes 6 and 22 can rise only until their voltage exceeds the voltage on the cathodes 57 and 64 of the diodes. When this voltage has been attained on the anodes of the tubes 6 and 22, the diodes 56 and 63 become conductive and hold the tube anodes at this value. This action is illustrated in graph D of FIGURE 2 in that the dotted line portion of the graph illustrates the natural discharge curve of the capacitor 31 upon rising to the full voltage of the bus 14. However, the anode 27 is clamped at the voltage indicated by the solid line portion of the graph by the action of the diode 63. It is seen therefore that the bias on the diodes 56 and 63; that is, the voltage on their cathodes, determines the recovery times of the anodes 7 and 27 and also the maximum voltage on the anodes. Consequently, the diodes have a two-fold effect upon the timing of the circuit since they determine the recovery time of the anodes and initially determine the difference between the starting voltage on the anode of the tubes and the cut off or bottoming voltage at the time $t_2$. This factor determines the elasped time between initiation of current flow to the anodes at the time $t_1$ and the termination of currnt flow at the anode at the time $t_2$. It is apparent therefore, that by varying the bias on the diodes 56 and 63 that the frequency of operation of the phantastron 1 may be readily controlled.

In accordance with the present invention the slider 59 which is operable over the resistor 61 is coupled to a calipering tool as by an arm 60 and is movable therewith so that the voltage appearing at the cathode 57 and 64 of the diodes 56 and 63, respectively, is at all times an indication of the relative position of a calipering arm of a well tool to a well tool casing. Thus, the frequency of oscillation of the phantastron 1 is a function of the diameter of a well bore being measured. Specifically, in the circuit of FIGURE 1 the period of oscillation varies directly with the movement of the slider and therefore the frequency varies inversely with the movement of the slider.

The voltage at which the diodes 56 and 63 conduct is relatively temperature sensitive, and since this voltage determines the time at which the tube anodes obtain maximum voltage, the period of oscillation is a temperature variable. At the higher frequencies, the percent variation of period with temperature may become appreciable, and since a well tool is often subjected to wide variations in temperature in proceeding from the bottom to the top of a well being logged, the frequency of the phantastron 1 is subject to undesirable variations in frequency. In order to minimize the effects of temperature upon the frequency of the phantastron 1, there is provided the thermistor 68 having a temperature co-efficient of resistance which tends to compensate for the temperature variations in the diodes 56 and 63. More particularly, the voltage across the diodes required to initiate conduction thereof is variable with temperature and therefore in order to render the circuit insensitive to temperature variations, the thermistor 68 must produce a variation of voltage at the tap 59 which is equal and opposite to the change in breakdown voltage due to temperature. Thus, if, with a ten degree increase in temperature, the breakdown voltage of the diodes decreases by half a volt, then the voltage at the tap 59 must be decreased by half a volt so that the anodes 7 and 27 are clamped at the same potential as prior to this temperature increase. By properly relating the characteristics of the normal resistance of the parallel combination of the thermistor 68 and resistor 69 as compared with the resistance of the resistors 61 and 67, the requisite temperature compensation effect can be obtained. Also the instrument is relatively insensitive to supply voltage changes, this being an inherent function of the double coupled phantastron oscillator.

As indicated in graph E of FIGURE 2, the voltage on the screen grid 24 of the tube 22 is a square wave having the same frequency as the frequency of the phantastron circuit 1. The voltage on the screen grid 24 is employed as the output voltage of the circuit 1 and is coupled through the capacitor 36 to the control grid 37 of the tube 38. The capacitor 36 and resistor 39 constitute a differentiating circuit and produce a positive pulse at the rise of each square wave and a negative pulse at the termination of each square wave. The clamping diode 41 however, removes the negative excursions and therefore the voltage at the control grid 37 of the tube 38 is a series of positive voltage pulses occurring at the frequency of oscillation of the phantastron circuit 1.

The pentode amplifier circuit 3 is a power amplifier and the pulses applied to its grid 37 are increased in energy content and appear as pulses of opposite polarity at the anode 46 of the tube 38. The voltage pulses appearing at the anode 46 of the tube 38 are coupled via the coupling capacitor to the lead 49 which in turn may be connected to the well tool cable 50 from which the apparatus of FIGURE 1 receives its high voltage. The capacitor 48 not only serves to couple the pulses to the cable 50 but also is employed to isolate the anode 46 from the high voltage of the cable.

It can be seen from the above that there is provided in accordance with the objects of the present invention a relatively simple and temperature insensitive telemetering device particularly adapted for utilization in bore hole measuring circuits. More particularly, the double cathode coupled phantastron circuit per se is a relatively voltage and temperature insensitive instrument and since the temperature compensation and control circuit 4 minimizes the effects of variation in temperature on the diodes the entire circuit is quite stable even at high frequencies. Further, the utilization of the differentiation circuit 2 to produce spiked pulses rather than a square wave voltage train permits the employment of circuits having a band width considerably less than those that would be required if square waves were transmitted to the surface and further permits the generation of very high energy pulses since the conduction time of the tube 38 is reduced considerably below that which would be required in transmitting square waves. Therefore, although the total power handling capability of the circuit is not increased, its instantaneous capacity is increased since its conduction time is relatively small.

Figure 3:
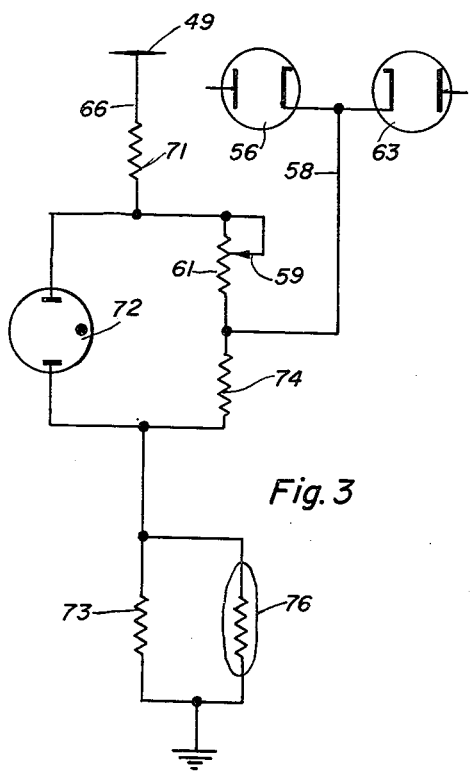
FIGURE 3 is a schematic wiring diagram of a second embodiment of the apparatus of the present invention.

As previously indicated, the circuit of FIGURE 1 produces an output frequency which varies inversely with movement of the slider 59 relative to the resistance 61. It is not intended to limit the present invention to a circuit of this type and in FIGURE 3 of the accompanying drawings, there is illustrated a circuit for sensing movement of a slider 59, which circuit, when included in the over-all system as illustrated in FIGURE 1 produces an oscillator output frequency varying as a linear function of the movement of the slider 59. Those elements of FIGURE 3 which are common with the elements of FIGURE 1 bear the same reference numerals and the circuit of FIGURE 3 is applied to the circuit of FIGURE 1 by connection to the leads 66, 58 and ground, all as illustrated in FIGURE 3. The circuit elements connected in FIGURE 1 between ground and the aforesaid leads are eliminated when the apparatus of FIGURE 3 is applied thereto.

Referring now specifically to FIGURE 3 of the accompanying drawings, the lead 66 is connected through a resistor 71 to an anode of a voltage regulator tube 72 and a cathode of the voltage regulator tube 72 is connected to ground. The regulator tube 72 has the resistor 61 and a further resistor 74 connected in series thereacross and the slider 59 associated with the resistor 61 is connected to one end of the resistor. The lead 58 is connected to the junction of the resistors 61 and 74 and this connection completes the circuit.

In operation, since the voltage across the glow tube 72 is constant, the total voltage across the resistors 61 and 74 is also constant. Since the voltage across the two resistors is constant, the current therethrough varies as an inverse function of the value of the resistor 61 or more specifically, of the position of the slider 59 relative to the resistor 61. The voltage across the resistor 74 varies as a product of its resistance and the current therethrough and inasmuch as resistance is fixed and the current varies as an inverse function of the position of the slider 59 relative to the resistor 61, the voltage on the lead 58 also varies as an inverse function of the position of the slider 59. In consequence, the period of oscillation of the double cathode coupled phantastron oscillator is an inverse function of the slider 59, and since frequency is an inverse function of the period of oscillation, the frequency may be a linear function of the position of the slider 59 provided that the circuit parameters are properly chosen. Thus, if the circuit of FIGURE 3 is employed with the basic circuit as illustrated in FIGURE 1, the variation of frequency of the oscillator with position of the slider 59 is a linear function over a wide range of positions of the slider 59 which is not true of the circuit of FIGURE 1 wherein linearity can be achieved only if the position of the slider 59 varies only very little with respect to the resistor 61.

If the circuit of FIGURE 3 is employed at high frequencies, there may be an appreciable variation of frequency with temperature and therefore in the second embodiment of the present invention, a thermistor 76 is connected in parallel with resistor 73 between the cathode of voltage regulator tube 72 and ground and serves the same purpose as the parallel combination of thermistor 68 and resistor 69 in FIGURE 1. Further, the parallel combination of resistor 73 and thermistor 76 may be connected in the lead 58 between the diodes on the one hand and the junction of the resistors 61 and 74 on the other. In either position the circuit serves to produce temperature compensation and therefore in accordance with the second embodiment of the invention, there is provided a circuit in which the frequency of oscillation is linear over a wide range of movements of the slider 59 and is substantially unaffected by temperature over relatively large variations in ambient temperature.

As previously indicated, in order to control the frequency or rate of production of the pulses applied to the lead 49 in accordance with a calipering device, the slider 59 may be connected to an arm 60 whose movement reflects the movements of a calipering tool with respect to the well tool casing, and the resistor 61 may be a circular resistor so that the tap 59 rotates thereover in accordance with rotation of the shaft.

Figure 4:
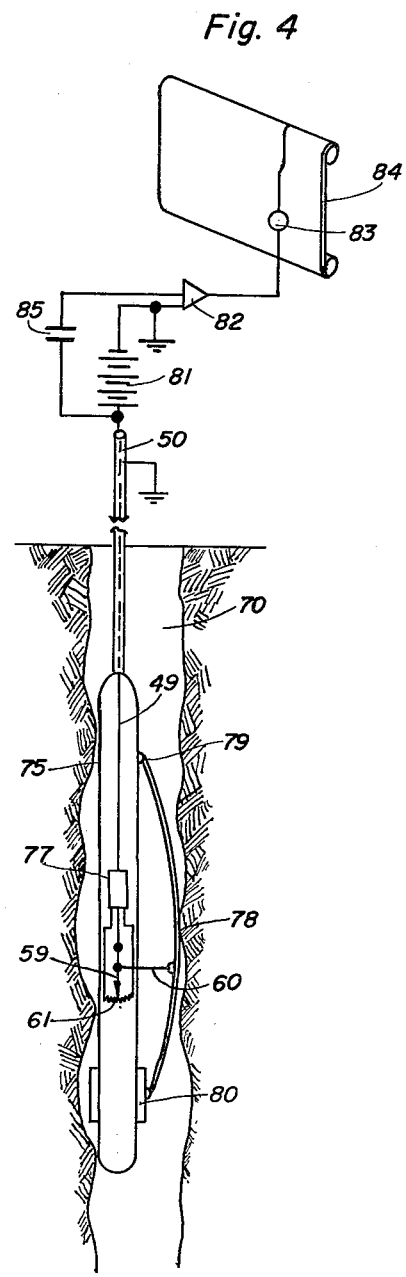
FIGURE 4 of the accompanying drawings illustrates the application of the apparatus of the invention to a well logging operation.

Referring now specifically to FIGURE 4 of the accompanying drawings, there is schematically illustrated a system in which the apparatus of the present invention may be incorporated. A well tool 75 is disposed within a well bore generally designated by the reference numeral 70 and is supplied electrical energy over the cable 50. The center conductor of the cable 50 is connected to the lead 49 which passes into a housing 77 for the components of the circuit illustrated in FIGURE 1, the housing 77 being disposed within the well tool casing 75. The well tool 75 may be provided with a bow spring caliper arm 78 secured to the housing 77 by stationary pivot 79 at its upper end and by a movable pivot 80 at its lower end. The arm 60 is connected from approximately the center of the bow spring 78 and passes through the casing of the well tool 75 into pivotal engagement with the wiper 59. Thus, upon inward and outward movement of the bow spring 78 relative to the well tool 75, the wiper 59 is rotated clockwise and counterclockwise, respectively, over the resistor 61 to effect changes in the frequency of oscillation of the phantastron oscillator 1.

At a surface station, a high voltage source 81, illustrated as a battery but not limited thereto since a rectified voltage supply may also be employed, is connected between the center conductor on the cable 50 and ground. The signal on the cable is connected through capacitor 85 to an input circuit of an appropriate amplifier circuit 82. The amplifier 82 may include a discriminator and a counting rate meter in order to convert the rate of production of pulses of the variable frequency pulse train to a D.C. voltage. The output voltage of the amplifier 82 may be applied to a recording galvanometer 83, or related instrument, which controls the movement of a pen or beam of light relative to a chart 84. Either ink or photographic recording may be employed, and if the chart is driven in synchronism with the well tool, a log of the diameter of the well relative to the depth of the well is provided.

It is seen from the above that the apparatus of the present invention is particularly applicable to utilization in well logging operations and is completely compatible with existing equipments. Further, the apparatus is relatively insensitive to supply voltage and temperature changes, is quite simple and therefore is physically suited to utilization in its intended environment.

While we have described and illustrated two specific embodiments of our invention, it will be clear that variations of the details of construction which are specifically illustrated and described may be resorted to without departing from the true spirit and scope of the invention as defined in the appended claims.

What we claim is:

1. A temperature compensated measuring circuit comprising a double cathode coupled phantastron oscillator including two pentode electron tubes, each of said tubes having an anode, a cathode, a control grid, a screen grid, and a suppressor grid, means connecting the cathode of each of said tubes to the suppressor grid of the other of said tubes, a pair of capacitors, means connecting said anode of each of said tubes through a distinct one of said capacitors to said control grid of the same tube, a high voltage lead, means connecting each of the anodes and the screen grids to said high voltage lead, and a pair of unilateral conducting devices each having an anode and a cathode; a second high voltage lead; a first resistor and a temperature variable impedance means connected in series between said second high voltage lead and a reference potential; a variable tap on said first resistor; means connecting the cathodes of said devices to said variable tap, said variable impedance means having a temperature coefficient of resistance such that the anode voltage at which said devices are rendered conductive is insensitive to variations in ambient temperature; an amplifier coupling one of said screen grids to said second high voltage lead; and means interconnecting said high voltage leads for direct voltages and isolating said leads from one another for alternating voltages.

2. A well surveying instrument comprising a well tool; a caliper arm movably supported on said well tool; a double cathode coupled phantastron oscillator including two pentode electron tubes, each of said tubes having an anode, a cathode, a control grid, a screen grid, and a suppressor grid, means connecting the cathode of each of said tubes to the suppressor grid of the other of said tubes, a pair of capacitors, means connecting said anode of each of said tubes through a distinct one of said capacitors to said control grid of the same tube, a high voltage lead, means connecting each of the anodes and the screen grids to said high voltage lead, and a pair of unilateral conducting devices each having an anode and a cathode; an electric cable, means for applying a high voltage to said cable; a first resistor and a temperature variable impedance means connected in series between said cable and a reference potential; a variable tap on said first resistor, means connecting the cathodes of said devices to said variable tap, said variable impedance means having a temperature coefficient of resistance such that the anode voltage at which said devices are rendered conductive is invariable with ambient temperature; means connecting said caliper arm to said variable tap for movement of the latter by the former; a differentiating and clipper circuit connected to one of said screen grids to produce short voltage pulses at the frequency of oscillation of said oscillator; an amplifier for amplifying said pulses and applying them to said cable; and means for interconnecting said high voltage lead and said cable for direct voltage and for isolating them for alternating voltages.

3. A measuring circuit for producing an output frequency which varies as a function of a condition to be measured comprising a double cathode coupled phantastron oscillator including two pentode electron tubes, each of said tubes having an anode, a cathode, a control grid, a screen grid, and a suppressor grid, means connecting the cathode of each of said tubes to the suppressor grid of the other of said tubes, a pair of capacitors, means connecting said anode of each of said tubes through a distinct one of said capacitors to said control grid of the same tube, a high voltage lead, means connecting each of the anodes and the screen grids to said high voltage lead, and a pair of unilateral conducting devices each having an anode and a cathode; a second high voltage lead; a first resistor connected between said second high voltage lead and a reference potential; a variable tap on said first resistor, means connecting the cathodes of said devices to said variable tap; an amplifier coupling one of said screen grids to said second high voltage lead; and means interconnecting said high voltage leads for direct voltages and isolating said leads from one another for alternating voltages.

4. A well surveying instrument comprising a well tool; a caliper arm movably supported on said well tool; a double cathode coupled phantastron oscillator including two pentode electron tubes, each of said tubes having an anode, a cathode, a control grid, a screen grid, and a suppressor grid, means connecting the cathode of each of said tubes to the suppressor grid of the other of said tubes, a pair of capacitors, means connecting said anode of each of said tubes through a distinct one of said capacitors to said control grid of the same tube, a high voltage lead, means connecting each of the anodes and the screen grids to said high voltage lead, and a pair of unilateral conducting devices each having an anode and a cathode; an electric cable; means for applying a high voltage to said cable; a first resistor connected between said cable and a reference potential; a variable tap on said first resistor; means connecting the cathodes of said devices to said variable tap; means connecting said caliper arm to said variable tap for movement of the latter by the former; a differentiating and clipper circuit connected to one of said screen grids to produce short voltage pulses at the frequency of oscillation of said oscillator; an amplifier for amplifying said pulses and applying them to said cable; and means for interconnecting said high voltage lead and said cable for direct voltage and for isolating them for alternating voltages.

References Cited in the file of this patent

UNITED STATES PATENTS

| | | |
|---|---|---|
| 2,230,216 | Boers | Jan. 28, 1941 |
| 2,640,271 | Boucher | June 2, 1953 |
| 2,649,786 | Goble | Aug. 25, 1953 |
| 2,656,613 | Goble | Oct. 27, 1953 |

OTHER REFERENCES

Publication, "Electronics," September 1953, 331–152, pages 169 and 170. (Copy in Div. 51.)

Textbook, "Waveforms," vol. 19, by Chance et al., pages 203, 204; copyright 1949, McGraw-Hill. (Copy in Div. 51.)

UNITED STATES PATENT OFFICE
CERTIFICATE OF CORRECTION

Patent No. 3,044,175                                      July 17, 1962

Marshall B. Broome et al.

It is hereby certified that error appears in the above numbered patent requiring correction and that the said Letters Patent should read as corrected below.

Column 3, line 68, after "of a" insert -- double --; column 4, lines 5 and 6, strike out "which pulses,"; column 6, line 47, for "currnt" read -- current --.

Signed and sealed this 13th day of November 1962.

(SEAL)
Attest:

ERNEST W. SWIDER
Attesting Officer

DAVID L. LADD
Commissioner of Patents